United States Patent
Lee (10) Patent No.: US 10,841,230 B1
(45) Date of Patent: Nov. 17, 2020

(54) INTELLIGENT CONTROLLER AND SENSOR NETWORK BUS, SYSTEM AND METHOD

(71) Applicant: Vulcan Technologies International Inc., Grand Cayman (KY)

(72) Inventor: Eugene Lee, San Jose, CA (US)

(73) Assignee: Vulcan Technologies Shanghai Co., Ltd., Shanghai (CN)

( * ) Notice: Subject to any disclaimer, the term of this patent is extended or adjusted under 35 U.S.C. 154(b) by 0 days.

(21) Appl. No.: 16/529,682

(22) Filed: Aug. 1, 2019

(51) Int. Cl.
*H04L 12/807* (2013.01)
*G06F 13/20* (2006.01)
*G05B 19/042* (2006.01)

(52) U.S. Cl.
CPC ............ *H04L 47/27* (2013.01); *G05B 19/042* (2013.01); *G06F 13/20* (2013.01); *G05B 2219/25056* (2013.01); *G06F 2213/40* (2013.01)

(58) Field of Classification Search
CPC .................. H04L 47/27; G05B 19/042; G05B 2219/25056; G06F 13/20; G06F 2213/40
See application file for complete search history.

(56) References Cited

U.S. PATENT DOCUMENTS

| | | | | |
|---|---|---|---|---|
| 6,013,108 A | * | 1/2000 | Karolys | G01D 3/022 702/122 |
| 6,473,793 B1 | * | 10/2002 | Dillon | H04B 7/18584 370/235 |
| 7,484,008 B1 | * | 1/2009 | Gelvin | G06F 15/173 709/249 |
| 8,274,359 B2 | * | 9/2012 | Alicot | G08B 13/2402 340/3.1 |
| 2010/0296492 A1 | * | 11/2010 | Jain | H04L 12/44 370/336 |
| 2019/0054834 A1 | * | 2/2019 | Bardot | B60L 53/60 |

* cited by examiner

*Primary Examiner* — Michael A Keller
*Assistant Examiner* — Jsing Forng Lin
(74) *Attorney, Agent, or Firm* — Haverstock & Owens LLP (57) ABSTRACT

A machine automation system for controlling and operating an automated machine. The system includes a controller and sensor bus including a central processing core and a multi-medium transmission intranet for implementing a dynamic burst to broadcast transmission scheme where messages are burst from nodes to the central processing core and broadcast from the central processing core to all of the nodes.

30 Claims, 5 Drawing Sheets

INTELLIGENT CONTROLLER AND SENSOR NETWORK BUS, SYSTEM AND METHOD

FIELD OF THE INVENTION

The present invention relates to the field of buses. More particularly, the present invention relates to a controller and sensor network bus architecture.

BACKGROUND OF THE INVENTION

The field of machine automation is expanding rapidly with the development of self-driving cars, intelligent robots and factory automation. However, due to their varied and high-speed needs, there is no bus or network architecture that is able to efficient handle all of the demands of these emerging technologies. Instead, the current networks latency is high, bandwidth is low, cabling is complex, with large electromagnetic interference (EMI), high cost, unsecured data and complex system integration. For example, networks do not have enough speed and throughput to carry sensor data like camera and light detection and ranging (LIDAR) data across the network to CPU Cores. Further, existing cable systems are complex, short-reach, and cannot deal with EMI without expensive shielding due to the use of copper cabling systems. There is no all-in-one "Controller and Sensor Network" system Bus solution that can support and carry internet L2/L3 Ethernet packets, Motor & Motion control messages, sensor data and CPU-CMD across a system from edge node to edge nodes.

SUMMARY OF THE INVENTION

A machine automation system for controlling and operating an automated machine. The system includes a controller and sensor bus including a central processing core and a multi-medium transmission intranet for implementing a dynamic burst to broadcast transmission scheme where messages are burst from nodes to the central processing core and broadcast from the central processing core to all of the nodes.

A first aspect is directed to a machine automation system for controlling and operating an automated machine. The system comprises a controller and sensor bus including plurality of input/output ports and implementing a dynamic burst to broadcast transmission scheme and a plurality of external machine automation devices operably coupled together via the ports of the bus, wherein the bus comprises a central processing core and a multi-medium transmission intranet comprising one or more central transmission networks directly coupled to the core and formed by a first type of transmission medium, the central transmission networks including a plurality of nodes and one or more gates and a plurality of subnetworks each coupled to a different one of the gates of one of the central transmission networks and formed by second types transmission mediums different than the first type of transmission medium, the subnetworks including a plurality of subnodes, wherein each of the nodes and the subnodes is coupled with one or more of the devices via one or more of the ports and receive input data from the one or more of the devices coupled to the one or more of the ports, wherein the bus relays the input data as messages from the nodes and the subnodes to the core and from the core to one or more of the nodes and the subnodes associated with the devices targeted by the messages.

In some embodiments, the bus relays the messages by bursting all of the messages from the nodes and the subnodes to the core in variable size burst windows and broadcasting each of the messages from the core to one node of group consisting of the nodes and the subnodes, the one node being associated with the device targeted by the message through one or more of the central transmission networks and the subnetworks and all of the nodes and the subnodes within the central transmission network and one or more of the subnetworks through which the message must travel to reach the one node. In some embodiments, the core dynamically adjusts and assigns a burst window start time and size to each of the nodes and the subnodes based on data traffic parameters reported from that one of the nodes and the subnodes. In some embodiments, each of the gates aggregates the messages from a plurality of the subnodes into a single larger message. In some embodiments, each of the gates omit portions of the messages from the plurality of the subnodes from the single larger message. In some embodiments, each of the gates receives the burst window start times and sizes granted to each of the subnodes of the subnetwork coupled to the gate, adjusts the burst window start times to an earlier time and transmits the burst window start times and sizes as adjusted to each of the subnodes of the subnetwork coupled to the gate.

In some embodiments, the second types of transmission mediums have a higher latency than the first type of transmission medium. In some embodiments, the first type of transmission medium is passive optical fiber and the central transmission networks are optical fiber networks. In some embodiments, the second types of transmission mediums comprise one or more of the group consisting of active copper cable and wireless signals, and the plurality of subnetworks comprise one or more of the group consisting of an active copper cable network, a controller area network and a wireless network. In some embodiments, the devices comprise one or more of the group consisting of an ultrasonic sensor, a light detection and ranging sensor, an infrared sensor, a camera, a motor and a microcontroller. In some embodiments, the automated machine is one of the groups consisting of a robot and a self-driving vehicle.

A second aspect is directed to a controller and sensor bus implementing a dynamic burst to broadcast transmission scheme and including plurality of input/output ports for coupling with a plurality of external machine automation devices of a machine automation system. The bus comprises a central processing core and a multi-medium transmission intranet comprising one or more central transmission networks directly coupled to the core and formed by a first type of transmission medium, the central transmission networks including a plurality of nodes and one or more gates and a plurality of subnetworks each coupled to a different one of the gates of one of the central transmission networks and formed by second types transmission mediums different than the first type of transmission medium, the subnetworks including a plurality of subnodes, wherein each of the nodes and the subnodes is coupled with one or more of the devices via one or more of the ports and receive input data from the one or more of the devices coupled to the one or more of the ports, wherein the bus relays the input data as messages from the nodes and the subnodes to the core and from the core to one or more of the nodes and the subnodes associated with the devices targeted by the messages.

In some embodiments, the bus relays the messages by bursting all of the messages from the nodes and the subnodes to the core in variable size burst windows and broadcasting each of the messages from the core to one node of group consisting of the nodes and the subnodes, the one node being associated with the device targeted by the message through one or more of the central transmission networks and the subnetworks and all of the nodes and the subnodes within the central transmission network and one or more of the subnetworks through which the message must travel to reach the one node. In some embodiments, the core dynamically adjusts and assigns a burst window start time and size to each of the nodes and the subnodes based on data traffic parameters reported from that one of the nodes and the subnodes. In some embodiments, each of the gates aggregates the messages from a plurality of the subnodes into a single larger message. In some embodiments, each of the gates omit portions of the messages from the plurality of the subnodes from the single larger message. In some embodiments, each of the gates receives the burst window start times and sizes granted to each of the subnodes of the subnetwork coupled to the gate, adjusts the burst window start times to an earlier time and transmits the burst window start times and sizes as adjusted to each of the subnodes of the subnetwork coupled to the gate.

In some embodiments, the second types of transmission mediums have a higher latency than the first type of transmission medium. In some embodiments, the first type of transmission medium is passive optical fiber and the central transmission networks are optical fiber networks. In some embodiments, the second types of transmission mediums comprise one or more of the group consisting of active copper cable and wireless signals, and the plurality of subnetworks comprise one or more of the group consisting of an active copper cable network, a controller area network and a wireless network. In some embodiments, the devices comprise one or more of the group consisting of an ultrasonic sensor, a light detection and ranging sensor, an infrared sensor, a camera, a motor and a microcontroller. In some embodiments, the automated machine is one of the groups consisting of a robot and a self-driving vehicle.

A third aspect is directed to a method of operating a controller and sensor bus implementing a dynamic burst to broadcast transmission scheme for controlling and operating an automated machine, the bus having a central processing core and a multi-medium transmission intranet including one or more central transmission networks directly coupled to the core and formed by a first type of transmission medium, the central transmission networks including a plurality of nodes and one or more gates and a plurality of subnetworks each coupled to a different one of the gates of one of the central transmission networks and formed by second types transmission mediums different than the first type of transmission medium, the subnetworks including a plurality of subnodes. The method comprises receiving data from a plurality of external machine automation devices with each of the nodes and the subnodes that is coupled with one or more of the devices via one or more ports of the bus and relaying the input data with the bus as messages from the nodes and the subnodes to the core and from the core to one or more of the nodes and the subnodes associated with the devices targeted by the messages.

In some embodiments, the relaying comprises bursting all of the messages from the nodes and the subnodes to the core in variable size burst windows and broadcasting each of the messages from the core to one node of group consisting of the nodes and the subnodes, the one node being associated with the device targeted by the message through one or more of the central transmission networks and the subnetworks and all of the nodes and the subnodes within the central transmission network and one or more of the subnetworks through which the message must travel to reach the one node. In some embodiments, the method further comprises dynamically adjusting and assigning a burst window start time and size to each of the nodes and the subnodes with the core based on data traffic parameters reported from that one of the nodes and the subnodes. In some embodiments, the method further comprises aggregating the messages from a plurality of the subnodes into a single larger message with each of the gates. In some embodiments, the method further comprises omitting portions of the messages from the plurality of the subnodes from the single larger message with each of the gates. In some embodiments, the method further comprises, with each of the gates, receiving the burst window start times and sizes granted to each of the subnodes of the subnetwork coupled to the gate, adjusting the burst window start times to an earlier time and transmitting the burst window start times and sizes as adjusted to each of the subnodes of the subnetwork coupled to the gate.

In some embodiments, the second types of transmission mediums have a higher latency than the first type of transmission medium. In some embodiments, the first type of transmission medium is passive optical fiber and the central transmission networks are optical fiber networks. In some embodiments, the second types of transmission mediums comprise one or more of the group consisting of active copper cable and wireless signals, and the plurality of subnetworks comprise one or more of the group consisting of an active copper cable network, a controller area network and a wireless network. In some embodiments, the devices comprise one or more of the group consisting of an ultrasonic sensor, a light detection and ranging sensor, an infrared sensor, a camera, a motor and a microcontroller. In some embodiments, the automated machine is one of the groups consisting of a robot and a self-driving vehicle.

DETAILED DESCRIPTION OF THE INVENTION

Embodiments described herein are directed to a machine automation system, method and device for controlling and operating an automated machine. The system, method and device including a controller and sensor bus including a central processing core and a multi-medium transmission intranet for implementing a dynamic burst to broadcast transmission scheme where messages are burst from nodes to the central processing core and broadcast from the central processing core to all of the nodes. As a result, the system, method and device provides the advantage of high speed performance despite combining lower speed network medium as well as one unified software image for the full intranet system including all gate, node and root ports enabling simplified software architecture, shorter product development cycle, and easier system level debug, monitoring and trouble shooting remotely. In particular, the system, method and device provides a unique intranet system architecture specially defined and optimized for machine automation applications.

Figure 1:
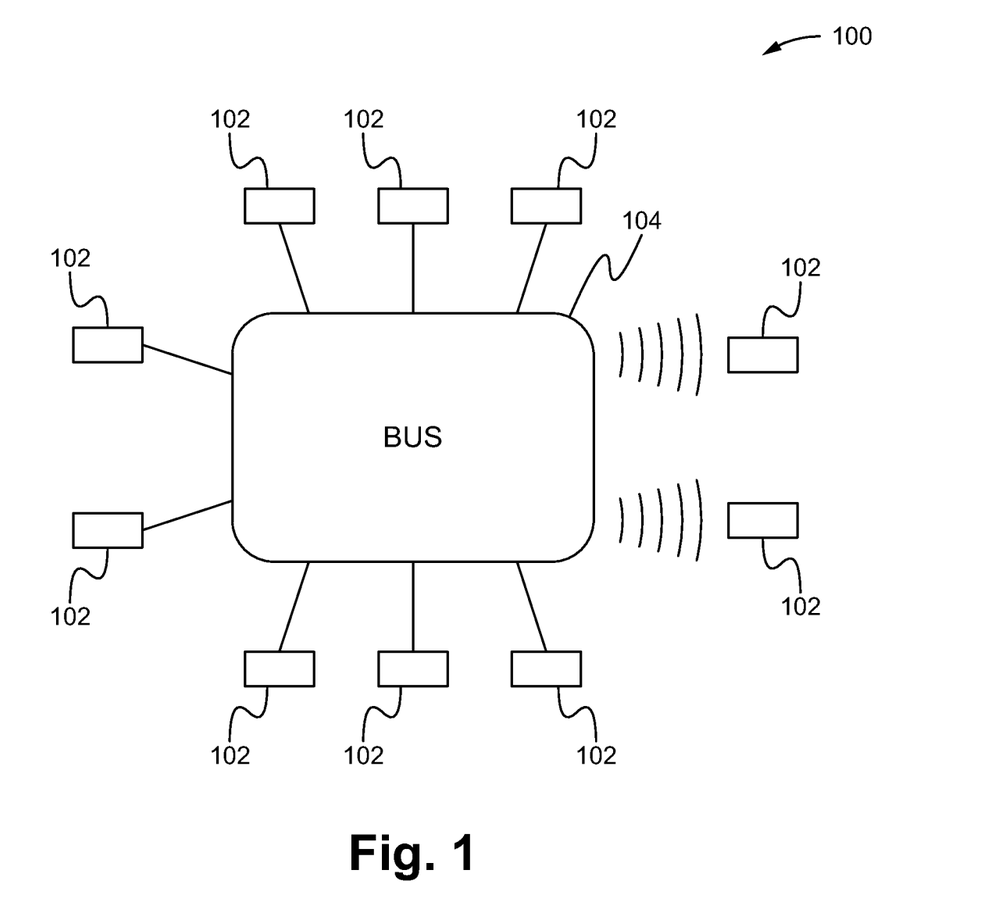
FIG. 1 illustrates a machine automation system according to some embodiments.

FIG. 1 illustrates a machine automation system 100 according to some embodiments. As shown in FIG. 1, the system 100 comprises one or more external devices 102 operably coupled together with an intelligent controller and sensor intranet bus 104. In some embodiments, the system 100 is able to be a part of an automated device such as a self-driving vehicle, an automated industrial machine or an automated self-controlled robot. Alternatively, the system 100 is able to be a part of other machine automation applications. The devices 102 are able to comprise one or more of sensor devices (e.g. ultrasonic, infrared, camera, light detection and ranging (LIDAR), sound navigation and ranging (SONAR), magnetic, radio detection and ranging (RADAR)), internet devices, motors, actuators, lights, displays (e.g. screens, user interfaces), speakers, a graphics processing units, central processing units, memories (e.g. solid state drives, hard disk drives) and controllers/microcontrollers. Each of the devices 102 is able to be operably wired and/or wirelessly coupled with the bus 104 via one or more bus input/output (IO) ports (see FIG. 2). Although as shown in FIG. 1, the system 100 comprises a discrete amount of external devices 102 and buses 104, more or less devices 102 and/or buses 104 are contemplated.

Figure 2:
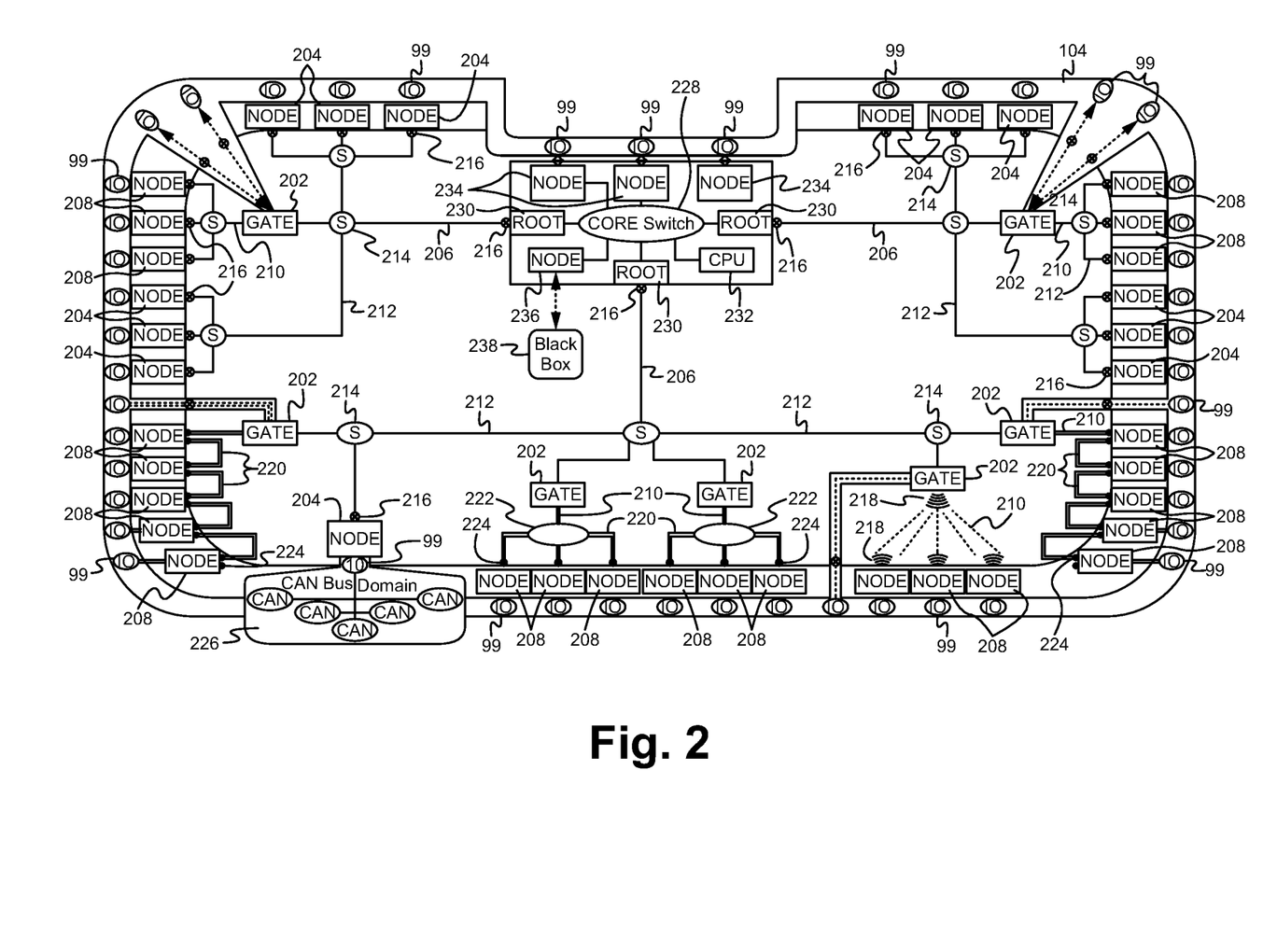
FIG. 2 illustrates an intelligent controller and sensor intranet bus according to some embodiments.
Figure 3:
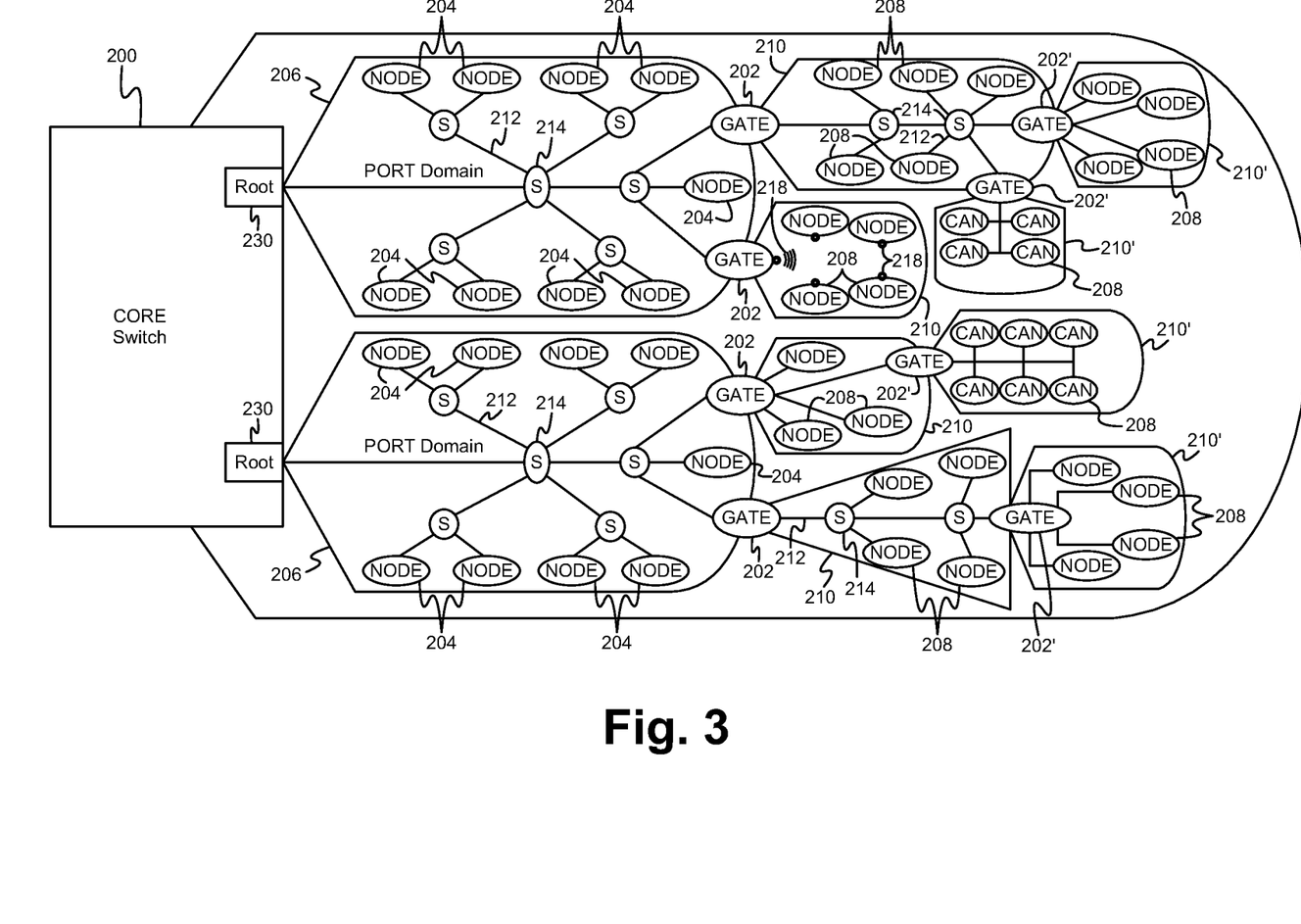
FIG. 3 illustrates a tree topology of an intelligent controller and sensor intranet bus according to some embodiments.

FIG. 2 illustrates the intelligent controller and sensor intranet bus 104 according to some embodiments. As shown in FIG. 2, the bus 104 comprises an intranet formed by a central core 200 that is coupled with one or more gates 202 and a plurality of edge nodes 204 (each having one or more external IO ports 99) via one or more central transmission networks 206, and coupled with one or more edge sub-nodes 208 (each having one or more external IO ports 99) via one or more sub-networks 210 that extend from the gates 202. As a result, as shown in FIG. 3, the bus 104 forms a network tree topology where the central networks 206 branch from the core 200 (e.g. root ports 230 of the core) to edge nodes 204 and gates 202, and the subnetworks 210 branch from the gates 202 to sub-nodes 208 and/or sub-gates 202'. In this way, the core 200 is able to see all of the nodes 204 and sub-nodes 208 (as the gates 202 and sub-gates 202' are transparent to the core 200). In some embodiments, one or more of the gates 202 are directly coupled with IO ports 99 without a node (e.g. to couple with external CPU, GPU, AI cores and/or solid state drives (SSD)).

The ports 99 are able to be any kind of interface port such as peripheral component interconnect express (PCIe), mobile industry processor interface (MIPI), Ethernet, universal serial bus (USB), general purpose input output (GPIO), universal asynchronous receiver/transmitter (UART), inter-integrated circuit (I²C) and/or other types of ports. Although as shown in FIG. 2, the bus 104 comprises a discrete amount of cores 200, nodes 204, 208, gates 202, networks 206, 210, other elements and components thereof, more or less cores 200, nodes 204, 208, gates 202, networks 206, 210, other elements and/or components there of are contemplated.

The central transmission networks 206 are able to comprise connection media that is faster/lower latency than the connection media of the subnetworks 210 coupled to a gate 202 of that central transmission network 206. Similarly, the subnetworks 210 are able to comprise connection media that is faster/lower latency than the connection media of the subnetworks 210' coupled to a gate 202' of the subnetwork 210 and so on for each iterative subnetwork. This network/ subnetwork connection media speed/latency relationship enables the bus 104 to prevent the slowing of the processing of the entire bus 104 despite still including the slower connection media as describe in detail below. Alternatively, one or more of the subnetworks 210, 210' and/or the central networks 206 are able to have the same or other connection media speed/latency relationships.

In some embodiments, the connection media of the central transmission networks 206 comprises optical fiber cables 212 split using optical splitters 214 (e.g 2-to-1 splitters) and having optical transceivers 216 to couple to and received data from the nodes 204, 208. In some embodiments, the connection media of the subnetworks 210 comprises optical connection media (e.g. like the central transmission networks 206, but possibly slower rating), wireless connections (e.g. radio frequency transceivers 218), copper connections (e.g. twisted-pair copper wires 220 optionally split using analog splitters 222 (e.g. fan-outs/multiplexers) and having serializer/deserializers (SERDES) 224 to couple to and received data from the nodes 204, 208), and/or combinations thereof (e.g. hybrid optical fiber, copper and/ or wireless connection media). As a result, the bus 104 supports multi-rate traffic transmissions where depending on the latency/speed, connectivity and/or distance requirements of the data/traffic/external devices 102, different nodes/ networks are able to be used to coupled to the bus 104 while still providing the desired throughput. For example, for high speed, low latency and long-distance requirements the optical connection media of the central network is able to be used by coupling to the nodes 204. Otherwise, the other networks 210 are able to be used depending on cost, speed, connection and/or distance requirements. In some embodiments, the central networks 206 are passive optical networks and/or the copper subnetworks 210 are active networks. In some embodiments as shown in FIG. 2, one or more of the nodes 204 is coupled to a controller area network (CAN) 226 such that the node inputs data from each of the controllers coupled to the controller are network. Alternatively, as shown in FIG. 3, one or more of the subnetworks 210 are able to be a CAN coupled with the core 200 via one of the gates 202.

Generic Encapsulation Mode

The bus 104 is able to encapsulate all input data into a generic encapsulation mode (GEM) for transport across the bus 104 intranet. Thus, the GEM acts as a unique standardized data and message container for transmitting data between nodes and/or to the core 200 via the bus 104 intranet. As a result, the input data is able to be encapsulated into the GEM format at each of the nodes as it enters the bus 104 and is routed through the core 200 (where it is decapsulated for processing and re-encapsulated for transmission) and onto its destination node which decapsulates the data back to the original format for egress to the target external device 102 or other destination. This input data is able to be from various sources (e.g. devices 102, CAN 226) input via the ports 99 at the nodes 204, 208, 234 or gates 202 and/or the embedded CPU cores 232.

There are two types of GEM formats: GEM packet and GEM control. The GEM packet format comprises a GEM header plus a GEM payload (e.g. length from 8 bytes to 4 kilobytes). Typically, the GEM packet format what is used to encapsulate the input port data, packets and messages at the ingress (e.g. nodes, ports). The following are some of the IO port data, packet and message examples that are able utilize the GEM packet format:

Use GEM packet format to carry Ethernet packets from local gate 202 and/or node 204, 208 through bus 104 after GEM encapsulation to far-end gate 202 and/or node 204 (e.g. this is able to be for internet and Wi-Fi interfaces through Ethernet Port or PCIe Ports);

Use GEM packet format to carry sensor data from local gate 202 and/or node 204, transmit through bus 104 after GEM encapsulation to far-end gate 202 and/or node 204 (e.g. CAN bus data, Camera (MIPI) Frame data, Lidar (Ethernet) data, Magnetic Encoder data (ADC) and other type of Sensors data;

Use GEM packet format to carry jumbo size data and packets and transmit through fragmentation and de-fragmentation scheme, from local node 204, 208 to far-end node 204, 208. This is able to include fragmentation, defragmentation and re-ordering/re-transmission functions;

Use GEM packet format to carry the network control, operation and management messages between core 200 and nodes 204, 208 (and/or gates), including physical layer operation, administration and maintenance (PLOAM), node management control interface (NMCI) and operations, administration and maintenance (OAM) messages;

Use GEM packet format to carry CPU/PCIe access CMD/DATA from core 200 and local gate 202 and/or node 204 through bus 104 after GEM encapsulation, to far-end local gate 202 and/or node 204 (e.g. CPU 232 access target device 102 from NODE-to-NODE through PCIe, USB, I2C, UART and GPIO interfaces).

Finally, use GEM packet format for VPN channel application between local-nodes 204, 208 to far nodes 204, 208 through bus 104.

The GEM control message format comprises message plus extended message (e.g. length 8 bytes+8 bytes . . . ). The GEM control message format is able to be used in the bus 104 for internal network management and control purposes, including messages of dynamic bandwidth allocation (DBA) reporting, DBA-Granting, GEM RX-Acknowledge, GEM Flow-Control, GEM Power-Management, GEM-Sniffer, GEM-Remote messages and/or other types of control messages. As described above, nodes 204 are responsible for encapsulating/decapsulating data to/from GEM packet and GEM control message format. This scheme is able to expand PCIe interface protocol from point-to-point topology to point-to-multi-point topology and extend the interface distance from short reach to long reach.

Accordingly, the GEM format provides the benefit of enabling the bus 104 to encapsulate varying input data and messages of significantly different types of networks (e.g. controller area networks, optical networks, sensor device broadcasting networks, wireless networks, CPU access networks) to one unique format (GEM). This unique format is then able to facilitate high speed standardized processing and transmission of the varied data input in both burst and broadcast messages thereby enabling the efficient operation of the multi-network multi-device bus architecture required for modern machine automation applications.

Core

The core 200 is able to comprise a core switch 228, one or more root ports 230 (internal ports), a central processing unit 232 and one or more core nodes 234 having IO ports 99 (external ports). In some embodiments, the core 200 further comprises a secure memory (e.g. secure digital (SD) memory) node 236 for storing data in a black box memory 238. Alternatively, the SD node 236 and/or memory 238 are able to be omitted. The core nodes 234 enable a user to couple a user plug-in module (e.g. CPU core, WIFI LTE/5G, User Application software) directly to the core 200 bypassing the networks 206, 210.

The core switch 228 comprises a forwarding engine element, a queuing buffer manager and a traffic manager. Forwarding engine element is able to comprise a plurality of forwarding engines. For example, it is able to include one engine used for L2/L3/L4 Ethernet header parser, lookup and classification/access control list (ACL) function, including L2 medium access control (MAC) Address learning and forwarding functions, L3 internet protocol (IP) Address to GEM-ID Routing/mapping. Additional, one engine is able to be used for GEM Header message parser, lookup, ACL and forwarding and/or another is able to be used to support DOS attack functions to protect the bus 104 from external internet DOS attack. The GEM-Queuing-Buffer Manager is able to be a centralized buffering architecture, which employs link-list based buffer and queuing memory methods combining store-N-forward and cut-through forwarding schemes. For latency sensitive GEM-Packet and GEM-Messages, it is able to use a cut-through forwarding scheme and for congestion GEM-Packets it is able to use store-N-forward scheme. Both schemes are able to be dynamically mixed together and dynamically switched between each other depending on the run-time traffic congestion situations. The GEM-Traffic Manager supports GEM-ID and NODE-ID base dual-token policing, single-token rate-limiting and output shaping functions, including related management information base (MIB) counters. GEM-ID base weighted random early detection (WRED) and Tail-Drop functions are able to be supported as well as early traffic congestion detection and indication and feedback mechanisms to notify hybrid dynamic bandwidth allocation mechanisms (HDBA), root ports 230, gates 202 and nodes 204, 208, 234 to slow down traffic transmission in order to avoid traffic congestion from occurring.

As a result, the core switch 228 is able to provide the functions of on ingress, the switch 228 receives GEMs from one or more of the root ports 230, local nodes 234, computer 232 and/or other IO ports, processes the GEMs and on egress, forwards and transmits the received GEMs to one or more of the root ports 230, local nodes 234, computer 232 and/or other IO ports. In other words, the switch 228 is able to accept GEM-Packets from multiple sources; perform GEM and Ethernet L2/L3/L4 header parsing, L2 MAC lookup and learning, GEM message and 5-tuple ACL and classification; modify GEM-Header and GEM payload Ethernet header (if necessary); and store and forward GEM-Packet (or cut-through buffer memory) to one or multiple hybrid automatic repeat request (HARQ) functional blocks and the broadcast-MAC of one or more root ports 230.

In performing this processing and/or forwarding function, the switch 228 is able to support hybrid store—and forward and cut-through forwarding schemes in order to reduce propagation latency for latency sensitive GEMs and provide big enough buffering for over burst GEM traffic. Additionally, the switch 228 is able to support instant-flow-control mechanisms within the bus 104, including hybrid dynamic bandwidth allocation and granting to ensure overall quality of service (QoS) across the bus 104. Further, the switch 228 is able to support L2/L3/L4 ACL and classification, L2 MAC address learning and forwarding, L3 IP address to GEM-ID routing/mapping, as well as DOS attack protection. Finally, the switch 228 is able to support QoS scheduling, GEM buffering WRED/Tail dropping, node and/or GEM policing and output shaping functions.

Root Ports

The root ports 230 are able to comprise a root transmission MAC, a root reception MAC, a security engine (e.g. advanced encryption standard (AES)), a forward error correction (FEC) engine, a hybrid dynamic bandwidth allocation (HDBA) engine, an activation processor (e.g. activation state machine) and a burst-mode SERDES IP. Alternatively, one or more of the above elements are able to be omitted. The transmission MAC of each of the root ports 230 is responsible for accepting GEMs ready for egress from switch 228 and/or HARQ; map and pack the GEMs into a broadcast frame format (e.g. Broadcast PHY-Frame structure); and broadcast the GEMs to all of the gates 202 and/or nodes 204 on the central transmission network 206 to which the root port 230 is coupled (e.g. through root SERDES and optical/copper network broadcast domains). Conversely, the reception MAC of each of the root ports 230 is responsible for receiving GEMs in a burst frame format (e.g. Burst-PHY-Frame structure) from Burst-Mode SERDES and gates 202 and/or nodes 204, 208; extracting the GEMs from burst frame format; parsing the GEM-header of the GEMs; and accepting the GEMs addressed to it (e.g. based on the GEM-Header and system service level agreement (SLA) profile settings), then outputting the GEMs/data to the switch 228 for further processing and forwarding. In other words, the root ports 230 are each able to receive burst traffic from the nodes 204 and/or gates 202 (forwarded from nodes 208 in the subnetwork 210 of the gate 202), convert the burst traffic to the correct format for processing by the switch 228 and then reformat and broadcast output traffic to all of the nodes 204 and nodes 208 (via the gates 202) to destinations as directed by the switch 228.

The hybrid dynamic bandwidth allocation (HDBA) engine is responsible for receiving reports about bandwidth usage, traffic congestion and other factors (e.g. NODE-DBA Reports); performing HDBA analysis based on an SLA profile for the node/port/device associated with each report, the DBA-Report data itself and committed information rate (CIR)/peak information rate (PIR) feedback; and granting burst windows to each NODE device and assigned port/EPOCH-ID. In other words, the HDBA engine inputs data from each of the nodes 204, 208 (of the network 206 associated with the root port 230 and subnetworks 210 thereof) and/or other sources about bandwidth usage/traffic congestion and dynamically allocates burst transmission window start times and/or sizes to each of those nodes 204, 208. In performing this allocation for the nodes 208 within the subnetworks 210, the gate 202 that provides access to the nodes 208 is transparent to the HDBA engine. As a result, as described in detail below, the gate 202 receives the desired data and performs the burst transmission within the assigned windows for each of the nodes 208 of the gate's 202 subnetwork 210. The HDBA engine is also able issue reporting acknowledgment messages (GEM-Report-ACK message) to nodes 204, 208 to confirm that the report messages (GEM-DBA Reports) were received.

The root Activation State-Machine is responsible for performing and completing node 204, 208, 234 device activation and registration through activation processes and procedures by exchanging physical layer operations, administration and maintenance (PLOAM) GEM messages between nodes 204, 208, 234 and the root port 230. The security engine is able to be an AES-128/256 encryption and decryption functional block used for both the reception and transmission MACs. Alternatively, other encryption is able to be used. The forward error correction (FEC) engine is used for controlling errors in data transmission over unreliable or noisy communication channels. In some embodiments, the FEC engine uses Reed Solomon FEC coding schemes of RS(255,216) and RS(225,232) for 10G and 2.5G data rates, respectively. Alternatively, the FEC engine is able to user low-density parity-check (LDPC) schemes and/or other FEC algorithms. The burst-mode SERDES uses fast clock and data recovery (CDR) locking mode to ensure proper burst messages (e.g. burst-PHY-Frames) are received correctly. In some embodiments, the fast locking function of CDR is required in fiber-cut, fast fail-over and protection switch recovery.

Finally, after a registration process, the root ports 230 receive broadcast data distribution service (DDS) messages from nodes 204, 208 that notify the root port 230 that new nodes/devices have joined and registered to bus 104. Accordingly, the root ports 230 are configured to always listen and accept these data distribution service (DDS) messages from the switch 228 and new node's 204, 208 declaration of joining the bus 104, and update the Root-Port SLA profile database and settings to reflect the newly added nodes/devices.

Nodes

The edge nodes 204, 208, 234 provide a bridge function within the bus 104 to interface with external devices 102 via the IO ports 99 on one side and connect to bus intranet 104 on the other side. In order to provide data from the devices 102 coupled to the ports 99 of the nodes 204, 28, the nodes 204, 208, 234 construct and transmit burst messages (e.g. Burst-PHY-Frames of the data encapsulated as GEMs) through the bus 104 to the other nodes 204, 208 via the root port 230 (of the network 206 of which they are a part or a subnetwork 210 thereof). Further, in order to provide data to the devices 102 coupled to the ports 99 of the nodes 204, 28, the nodes 204, 208, 234 receive broadcast message (e.g. Broadcast-PHY-Frames of the data encapsulated as GEMs) from other nodes 204, 208 via the root port 230 (of the network 206 of which they are a part or a subnetwork 210 thereof), extract the data from the broadcast messages (e.g. GEMs from RX BC-PHY-Frames), and filter and accept the data that belongs (is addressed to) the node 204, 208.

To perform these and other functions, the edge nodes 204, 208 are able to comprise one or more IO ports 99, an encapsulation/decapsulation engine, a HARQ block and a node MAC. Each of the ports 99 is able to be one of a CPU interface (e.g. PCIe, USB and UART), a sensor interface (e.g. MIPI, analog to digital converter (ADC), GPIO), an internet interface (e.g. Ethernet, EtherCAT, and CAN-Bus), and a motor module interface (e.g. pulse width modulation (PWM), I²C, ADC and GPIO). The encapsulation/decapsulation engine accepts input data from the ports 99 and encapsulates received data packets, commands (CMD) and messages received from the internet ports (e.g. Ethernet, Wi-Fi), sensor interfaces, motor module interface and CPU (e.g. PCIe and USB) to the GEM format at the ingress. The nodes 204, 208 then are able to output to the encapsulated messages (e.g. GEMs) to the HARQ and/or node transmission MAC (described below). At the egress, it accepts GEM-packets from the node reception MAC (received from the root port 230 and/or another node 204, 208, 234) and decapsulates the GEM back to the original data format (as received from the coupled device 102) for output to the device 102 via one of the ports 99. Like in the root ports 230, the HARQ of the nodes 204, 208 perform the hybrid automatic-repeat-request function to ensure that the GEM-Packets are delivered to their destination node or nodes 204, 208, 234 successfully. Specifically, the HARQ is able to be built-in with a repeat transmit timer, transmit GEM list flag table and receipt acknowledgment checking function (e.g. GEM RX-Acknowledge) to trigger GEM re-transmission when timer time-out occurs without receiving the acknowledgment.

The node MAC comprises a transmission MAC (TX MAC), a reception MAC (RX MAC), a security engine (e.g. AES), a forward error correction (FEC) engine, a DBA-Report engine and SERDES IP. The TX MAC is responsible for mapping/packing GEMs into a burst structure (e.g. Burst-PHY-Frame structure) and transmitting the burst messages to root ports 230 and/or nodes 204, 208, 234 during the burst window for the node granted by the dynamic burst allocation engine of the root port 230 for that node. The RX MAC is responsible for receiving and terminating broadcast messages (e.g. Broadcast-PHY-Frames) from root ports 230 and/or nodes 204, 208, 234, extracting GEMs from the broadcast message format, parsing and accepting GEMs addressed to it (e.g. addressed to one of its ports 99) based on the node's SLA Profile setting, and subsequently outputting the data to the encapsulation/decapsulation engine.

The DBA report engine reports total data packet and message in queues (e.g. EPOCH Queues) to the HDBA engine of the associated root port 230 through the burst reporting (as described above). Additionally, the DBA report engine accepts GEM-Grant messages from the HDBA of the associated root port 230 and/or the DBA of the associated gate 202, and prepares the node transmission MAC to build a burst message (e.g. Burst-PHY-Frame) with the GEMs stored in the queues (e.g. EPOCH Queues).

The node activation processor is responsible for performing and completing the node 204, 208, 234 activation process and procedures between nodes 204, 206, 234 and root ports 230. The security engine is able to be an AES-128/256 encryption and decryption functional block used for both the reception and transmission MACs. Alternatively, other encryption is able to be used. The FEC engine is used for controlling errors in data transmission over unreliable or noisy communication channels. In some embodiments, the FEC engine uses Reed Solomon FEC coding schemes of RS(255,216) and RS(225,232) for 10G and 2.5G data rates, respectively. The burst-mode SERDES uses fast clock and data recovery (CDR) locking mode to ensure fast fiber-cut, fast fail-over and protection switch recovery.

Finally, after activation processing (e.g. after the registration process is complete), the nodes 204, 206, 234 are able to broadcast a DDS message to entire bus 104 to inform and notice the root ports 230, switch 228, gates 202 and/or other nodes 204, 206, 234 that a new device has joined and registered to bus 104 at that node 204, 208, 234. Further, the nodes 204, 206, 234 are able to listen to DDS messages from the switch 228 and other new the nodes' 204, 206, 234 declaration of joining the bus 104 and update their global SLA profile database and settings based on the DDS messages.

Gates

The gates 202 are able to comprise a node MAC (with multiple Virtual node State-Machines and buffering), an adaptive domain bridge (ADB), a root port MAC (with built-in gate DBA functionality/gate DBA), a gate SLA profile database and a burst-mode SERDES. The node MAC comprises one or more of a transmission MAC, reception MAC, security engine (e.g. AES), FEC engine, DBA report functional module, SERDES functional module and/or multiple sets (e.g. one for each node within the subnetwork 210) of virtual node processors, virtual node profiles and settings, and related MIB counters and reporting logics. The transmission MAC receives GEMs from the gate ADB and maps and packs then into their associated virtual node burst structure (e.g. Burst-PHY-Frame structure) based on the gate's virtual node SLA Profile database settings. Further, the transmission MAC aggregates multiple virtual node burst structures (e.g. Burst-PHY-Frames) into one gate burst structure (e.g. GATE/Turbo Burst-PHY-Frame) and transmits burst message to the root port 230 through the network 206 based on the granted burst window for those nodes 208 received from the HDBA of the root port 230. The node reception MAC receives broadcast messages (e.g. Broadcast-PHY-Frames) from the root port 230, extracts GEMs from the messages, parses the headers of the GEMs, determines which messages are for nodes 208 within the subnetwork 210 of the gate 202 based on the GEM-Headers and virtual nodes SLA Profile database settings and outputs those messages to the ADB.

The ADB performs a bridging function between the node MAC and the root MAC of the gates 202. Specifically, in the broadcast direction (from the root port 230 to the nodes 208), the ADB receives GEMs from node reception MAC and performs a GEM header lookup, checking and filtering function based on the gate virtual node profile database in order to accept GEMs belonging to nodes 208 of the gate's 202 subnetwork 210. The ADB is then able to output those GEMs to root port transmission MAC of the gate 202. In the burst direction (from the nodes 208 to the root port 230), the ADB receives GEMs from root reception MAC, stores them in their associated virtual node buffer memory, and output them to the virtual node transmission MAC when their burst window start time arrives.

The root port MAC of the gates 202 comprise a transmission MAC, a reception MAC, a security engine (e.g. AES), an FEC engine, a gate DBA and burst mode SERDES modules. The transmission MAC is responsible for accepting GEMs from ADB, mapping and packing the GEMs into a broadcast format (e.g. Broadcast-PHY-Frame structure), and outputting the broadcast formatted frames to burst-mode SERDES. The reception MAC is responsible for receiving burst messages (e.g. Burst-PHY-Frames) from burst-mode SERDES (e.g. a far end node), extracting the GEMs from the messages, parsing and accept only GEMs targeted for nodes 208 within the gate's 202 subnetwork 210 (as indicated based on the parsed GEM headers and the SLA Profile settings), and then outputting the GEMs to the ADB of the gate 202. The DBA of the gate 202 is an extension HDBA of the root ports 230. The gate DBA grants and allocates node burst windows based on the gate DBA SLA profile settings (which is a subset of the root HDBA). The gate SLA profile database includes a list of node identifiers belonging to this gate 202 (e.g. located within the subnetwork 210 of the gate 202), an SLA profile table of node identifiers for a gate DBA function and GEM forwarding information. The burst mode SERDES accepts broadcast messages (e.g. Broadcast-PHY-Frames) from the root transmission MAC and transmits to nodes 208 in the subnetwork 210 in the broadcast transmission direction. In reception direction, the burst-mode SERDES receives burst messages (e.g. Burst-PHY-Frames) from nodes 208 through the subnetwork 210 and outputs them to the root reception MAC for message/frame termination and GEM extraction.

The main function of gates 202 is to extend the central transmission network 206 of one of the root ports 230 by bridging to one or more subnetworks 210 (and the nodes 208 therein) through adaptive bridging. In particular, the gates 202 are able to burst messages from the nodes 208 and/or other gates 202' within their subnetwork 210 to the root port 230 of the network 206 they are in as if the burst traffic were coming from nodes within the central transmission network 206. Similarly, the gates 202 are able to broadcast messages received from other nodes 204, 208, 234, the switch 228 and/or root port 230 to the nodes 208 and/or other gates 202' within their subnetwork 210 they are in as if the nodes 208 and/or other gates 202' were within the central transmission network 206. As a result, the gates 202 are able to extend the central transmission networks 206 to additional nodes 208 and/or different types of subnetworks 210 while maintaining a burst/broadcast communication method within the central transmission networks 206.

In more detail, in the transmission Burst direction (e.g. from the nodes/gates to the root ports/switch/core), the burst window granting mechanism from node 208 to gate 202 to root 230 is able to comprise the following steps. First, the DBA of the gate 202 is a subset of the HDBA of the root port 230 (of the network 206 that the gate 202 is a part of) and therefore is transparent to the root port 230 and nodes 208. Second, when the gate 202 receives a burst window grant message (e.g. GEM-Grant message) broadcast from its root port 230, it uses the message header (e.g. GEM-Header) to lookup gate SLA profile database for GEM forwarding information. In other words, it uses the header data to determine if the grant message is for any of the nodes 208 within its subnetwork 210 as indicated in the gate SLA profile database. If the grant message is not for any of the nodes 208 of its subnetwork 210 the gate 202 drops the grant message, otherwise, the gate stores the message in its virtual node database, updates the database and broadcasts a new window grant message (e.g. GEM-Grant message) to all the nodes/gates in its subnetwork 210 that is directed to the node 208 to which the original grant message was directed. In response, the node 208 provides a burst message to the gate 202 and the gate 202 formats and/or otherwise prepares the message for bursting to the root port 230 at the burst window start indicated in the received window grant message for that node 208.

Third, in order to get best throughput bandwidth, high burst bandwidth efficiency and/or low transmission latency, gate 202 is able to adjust the grant window indicated in this new grant message to be at least a predetermined amount of time before the grant window indicated in the original grant message. In particular, this amount of time provides the gate 202 time to receive and format the burst data from the node 208 before bursting the data from the gate 202 to the root port 230 at the time indicated by the original window grant message. Indeed, by doing this for multiple nodes 208 at the same time, the gate 202 is able to aggregate the messages from multiple different nodes (e.g. multiple Burst-PHY-frames) into a single bigger burst message (e.g. GATE Burst-PHY-Frame).

Fourth, due to the protocols between gate traffic DBA reporting and the root port 230 window granting, root port 230 and gates 202 are able to maintain a group-membership list table and be aware of the virtual nodes 208 that each of the gates 230 below to as a group. Thus, when a node 208 issues a report message (e.g. GEM-Report) to HDBA of the root port 230, the gate 203 is able to intercept the report message, modify it to include the GEMs data temporarily stored in gate's 202 virtual node buffer memory if there is any, and issue a new report message to HDBA of the root port 230. In other words, the gates 202 are able to combine reporting messages from the nodes in their subnetworks 210 in order to make the reporting more efficient.

Additionally, when HDBA of the root ports 230 are issuing a grant message (e.g. GEM-Grant message) to nodes 208 that are in a subnetwork 210, because they are aware of all of the nodes 208 that are in that subnetwork 210 (e.g. via the virtual node database), the HDBA of the root ports 230 are able to ensure that the grant windows for nodes 208 that belong to the same gate 202 and/or subnetwork 210 are in sequence/continuous order so that the gate 202 is able to combine and/or burst all the virtual node's burst messages (e.g. burst-PHY-Frames) without each having a preamble except for the first one. This provides the benefit of reducing preamble overhead and increasing the burst bandwidth efficiency (especially for small bursts of GEM-Control messages).

In other words, for the data-path, the gates 202 receive burst messages (e.g. burst-PHY-frames) from burst-mode SERDES and far-end nodes 208, extracts the GEMs from the messages in the root reception MAC of the gate 202, stores the GEMs in their associated virtual NODE buffer memory and waits for the virtual node burst window grant to come in from the root port 230 for those virtual nodes 208. Then, the gates 202 are able to map and pack the stored GEMs for that node 208 and other nodes 208 back into the burst message format thereby aggregating multiple burst messages together into one bigger burst message in the node transmission MAC of the gates 202. Finally, the gates 202 are able to transmit this bigger burst message to the SERDES and to the root port 230 through the network 206 based on granted burst windows (e.g. the multiple consecutive virtual node burst windows of that gate 202).

Now looking to the broadcast direction (e.g. from the root ports/switch/core to the nodes/gates), again the gates 202 are able to extend central networks 206 to the subnetworks 210 while being transparent to both the root port 230 for their network 206 and the nodes 208 in their subnetwork 210. In order to effectuate this, the gates 202 are able to act like virtual nodes and receive broadcast messages (e.g. Broadcast-PHY-Frames) from the root ports 230, extract the GEMs from the messages, drop any GEMs that are not directed to one of the nodes 208/gates 202' in their subnetwork 210 (e.g. as indicated by the message headers and the gate SLA profile database). Otherwise, the gates 202 are able to use store-N-forward and/or cut-through schemes to pack and map the GEMs back into the root port broadcast message structure (e.g. Broadcast-PHY-Frame structure) in a root transmission MAC of the gate 202 and broadcast the new broadcast message to all the nodes 208 and/or gates 202' in its subnetwork 210.

Burst/Broadcast Frame Format

In some embodiments, the broadcast messages are formatted into a Broadcast-PHY-Frame defined by: Preamble+Start-of-Frame-Delimiter+Frame-Payload, wherein the frame payload includes multiple GEM-Packet data and GEM-Control messages. The Broadcast-PHY-Frame is able be a fixed frame size (e.g. between 25-125 μs). Alternatively, greater or smaller frame sizes are able to be used. For example, for central networks 206 and subnetworks 210 with less node devices 204, 208, the frame size is able to be smaller (e.g. 25 μs or 50 μs). In some embodiments, the Broadcast-PHY-Frame is constructed to carry GEM-Packet and GEM-Control messages from the root ports 230 to the gate 202 and/or nodes 204, 208, 234 through the networks 206, 210 including optical, copper and wireless networks.

In some embodiments, the burst messages are formatted into a Burst-PHY-Frame defined by: Preamble+Start-of-Frame-Delimiter+Frame Payload+End-of-Frame-Delimiter, wherein the frame payload includes one or more GEM-Packet data and GEM-Control messages. The Burst-PHY-Frame size is able to vary depending on the total Burst-Window size of node/gate granted by root port HDBA and/or gate DBA. In some embodiments, the max size of Burst-PHY-Frame (from a gate 202 or a node 204, 208, 234) cannot exceed the max Broadcast-PHY-Frame size (e.g. between 25-125 μs). In some embodiments, the Burst-PHY-Frame is constructed to carry GEM-Packet and GEM-Control messages from gates 202 and/or nodes 204, 208, 234 to the root ports 230 and/or gates 202 via the networks 206, 210 including optical, copper and wireless networks.

Data Transmission Operation

In operation, the bus 104 operates using a burst/broadcast communication scheme wherein all data messages from the nodes 204, 208, 234 (and gates 202) are funneled to the core 200 using a burst transmission method where transmission windows that are dynamically adjustable in size (by the core 200) are granted to the nodes 204, 208, 234 such that they (or a gate 202 on their behalf) are able transmit their data messages as a "burst" within the granted window. If the transmitting node is in a subnetwork 210, the gate 202 (acting as a root port of that network 210) receives the bursted message from the node 208 through the subnetwork 210 and then subsequently bursts the message through the central network 206 to the core 200 (as if the node 208 was a part of the central network 206). In doing this burst communication, the gate 202 is able to aggregate burst messages from multiple nodes 208 within the subnetwork 210 thereby increasing efficiency and reducing the effects of the subnetwork's 210 possibly increased latency relative to the central network 206. Indeed, this is able to be repeated for gates 202' within subnetworks 210 that provide a gate way to sub-subnetworks 210' and so on to support any number of "chained/gated" networks. Further, the gate 202 is able to be transparent to the core 200 and nodes 208 in this process such that messages do not need to be addressed to the gate 202.

The core 200 receives these messages (from one or more root ports 230 coupling the core 200 to each of the central networks 206), processes them (including modifying and/or determining their target destination), and broadcasts them (and any messages originating in the core 200) onto whichever central transmission network 206 the target node 204, 208, 234 (or gate 202 representing the target node 208) for that message is located. Like the burst communication above, if the target node 208 is within the subnetwork 210, the gate 202 bridging to that subnetwork 210 is able to receive/intercept the message from the core an rebroadcast the message to all of the node 208 (and/or gates 202') on the subnetwork 210. Any broadcast messages for target nodes 204 not on the subnetwork 210 (or a subnetwork thereof) are able to be discarded by the gate 202 in order to increase efficiency. Again, this process is transparent and able to be repeated by gates 202' within subnetworks 210 and so on for any number of chained networks to broadcast the messages through the networks. As a result, all the nodes 204, 208, 234 (and gates 202) on each of the networks 206 (and subnetworks 210 coupled thereto) receive all of the messages from the core 200 broadcast on that network 206 and merely need to look for which messages are directed to them while discarding the others.

In more detail, when the nodes 204, 208, 234 receive data from one or more external devices 102 through one or more of their IO ports 99, they store the data in a GEM-ID queue buffer memory and burst a report message (e.g. GEM-Report) to the root port 230 of the central network 206 that they are in (either directly or through one or more gates 202 if they are in a subnetwork 210 of the central network 206) and wait to be granted a burst window to transmit the input data. As described above, the gates 202 are able to collect and aggregate report messages from a plurality of the nodes 208 (and or gates 202') in their subnetwork 210 into a single bigger report message that the gate 202 is able to more efficiently burst to the root port 230 during the burst window for those ports 208.

At the same time, the nodes 204, 208, 234 are able to encapsulate the input data into the GEM format (fragmenting GEMs exceeding a predefined size into smaller GEMs), encrypt GEMs with the security key of the node 204, 208, 234, update the HARQ table, map and pack the GEMs into a burst format (e.g. Burst-PHY-Frame format) and perform encoding (e.g. FEC RS(255,216) encoding). Subsequently, upon grant and arrival of the burst window for each of the nodes, the nodes burst the GEMs including the input data to the associated root port 230.

The HDBA of the root ports 230 receive all of the report messages from the nodes 204, 208 (and/or gates 202) and perform a DBA analysis for each of the nodes 204, 208 based on the SLA profile database, latency sensitive level, traffic congestion feedback, committed information rate (CIR)/peak information rate (PIR) feedback and/or other factors to determine grant window burst size and start-time for each of the nodes 204, 208. Once the granted burst windows have been determined for one or more of the nodes 204, 208, the root port 230 broadcasts the windows to each of the nodes in a broadcast grant message (e.g. GEM-Grant) to all of the nodes 204, 208 in the associated central network 206 and/or any subnetworks 210 (via the gates 202). As described above, the broadcast messages from the root ports 230 are the same size, whereas the burst windows from the nodes 204, 208 to the root ports 230 are able to vary in size as dynamically assigned by the HDBA.

The gates 202, upon receipt of the broadcast grant messages targeting nodes 208 within their subnetwork 210 (or a subnetwork thereof), broadcast new grant messages to all of the nodes 208 with the subnetwork 210. Specifically, these new grant messages are able to specifying burst windows that occur before the time indicated by the original/root port grant window. This is to ensure the gates 202 to receive (e.g. be "bursted") the input data/GEMs from the port 208 before the original/root port grant window, thereby giving the gates 202 time to aggregate the data/GEMs from multiple nodes 208 and/or ports 99 into single larger messages for burst to the root port 230 when the original/root port grant window arrives. As a result, the gates 202 are able to make up for inefficiencies and/or slower aspects of the subnetworks 210 such that they do not slow down the efficiency of the central transmission networks 206.

Upon receipt of the burst messages including the GEMs (including the input data from the external devices 102), the root ports 230 are able to perform decoding (e.g. FEC RS(255,216) decoding) and error correction on the burst messages to decode and correct any transmission errors. The root ports 230 are then able to extract the GEMs from the burst messages (e.g. the transmission frame format), decrypt the extracted GEMs (e.g. with AES-128/256 and a source-node security key), bypass the GEM fragmentation block and pass GEMs to the switch 228. For each of the GEMs, the switch 228 is then able to perform a GEM-Header lookup, parse and classify Ethernet L2/L3 address and headers, process GEM forward flow-chart and determine GEM forwarding destination info, store the GEM in (cut-through) buffer-memory, and output the GEM to HARQ and to the destination root port 230 (e.g. the root port 230 whose network 206 or subnetwork 210 thereof includes the destination node 204, 208) based on the SLA database QoS output scheduler.

The root ports 230 receive the GEMs, perform GEM encryption (e.g. AES-128/256 encryption) with target node's (or broadcast GEM's) security key, pack and map GEMs into a broadcast message structure (e.g. Broadcast-Frame structure), encode the message (e.g. FEC RS(255, 216) encoding), and finally broadcast the broadcast messages to all of the nodes 204, 208 in that root port's network 206 and subnetworks 210 thereof. If the node 208 is within a subnetwork 210, the gate 202 to that subnetwork receives the broadcast message and broadcasts the message to all of the nodes 208 within the subnetwork 210. In some embodiments, the gates 202 filter out any broadcast messages that are not targeted to nodes 208 within its subnetwork 210 (or a subnetwork thereof) and only broadcasts the broadcast messages that do target one of those nodes 208. Alternatively, the gates 202 are able to rebroadcast all of the broadcast messages to the nodes 208 within its subnetwork 210 without determining if the messages relate to one of those nodes 208.

All the nodes 204, 208 monitor the received broadcast messages, processing those intended for the node 204, 208 and discarding the others. Specifically, for the non-discarded messages, the nodes 204, 208 decode and error correct the messages (e.g. FEC RS(255,216) decoding), extract the GEMs from the broadcast message format (e.g. BC-PHY-Frame), decrypt the extracted GEM (e.g. with AES-128/256 and the destination node's security key), decapsulate the data from the GEM format back to original IO-Port data format, and output the data through the designated IO port 99 to the external device 102. As a result, the bus 104 and system 100 provides the benefit of being able to combine multiple different networks having varying input data, varying processing speeds and data constraints while still maintaining low latency and high throughput needed for machine automation systems. This is a unique intranet system architecture and specially defined and optimized for such machine automation applications.

Figure 4:
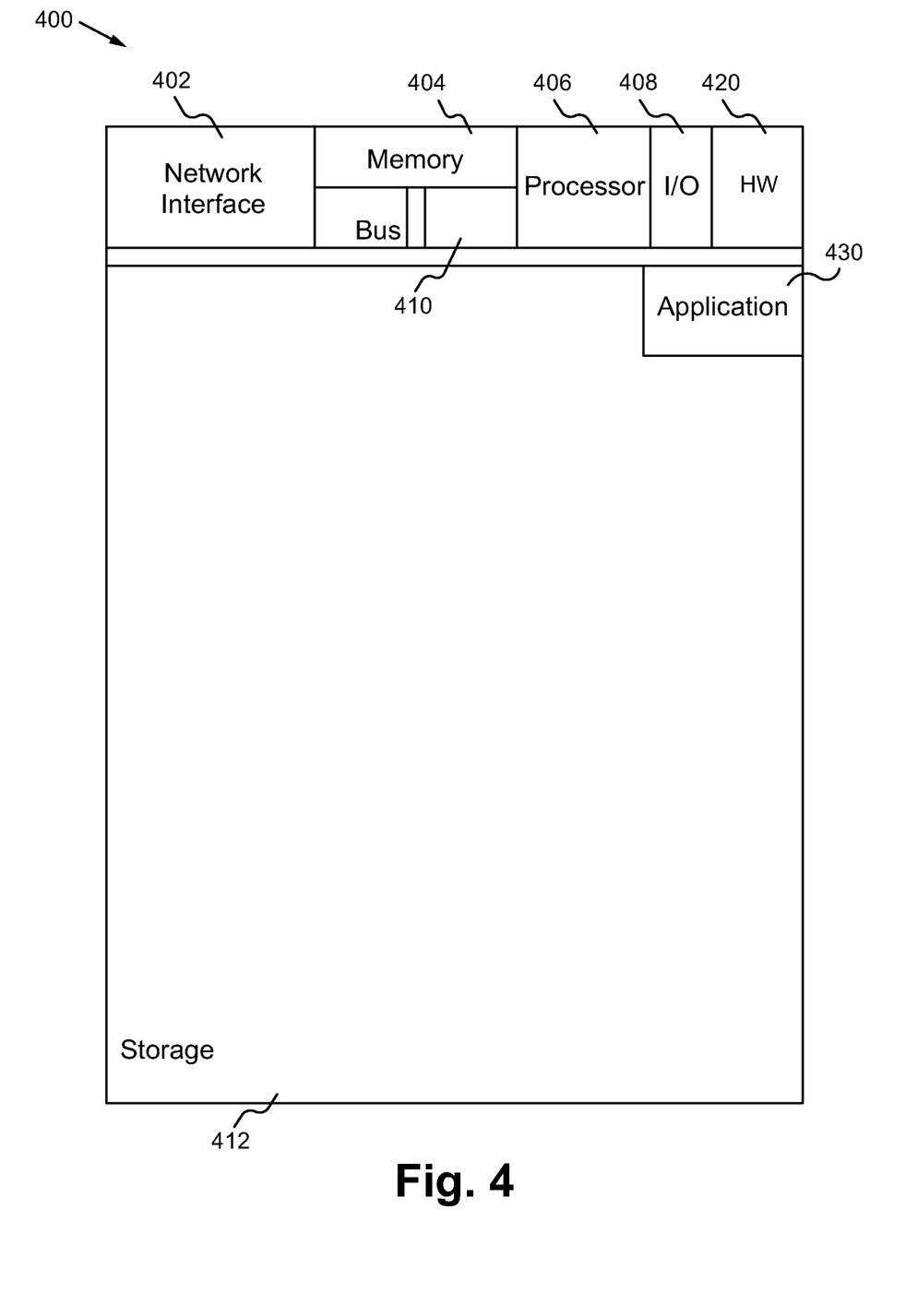
FIG. 4 illustrates a block diagram of an exemplary computing device configured to implement the system according to some embodiments.

FIG. 4 illustrates a block diagram of an exemplary computing device 400 configured to implement the system 100 according to some embodiments. In addition to the features described above, the external devices 102 are able to include some or all of the features of the device 400 described below. In general, a hardware structure suitable for implementing the computing device 400 includes a network interface 402, a memory 404, a processor 406, I/O device(s) 408 (e.g. reader), a bus 410 and a storage device 412. Alternatively, one or more of the illustrated components are able to be removed or substituted for other components well known in the art. The choice of processor is not critical as long as a suitable processor with sufficient speed is chosen. The memory 404 is able to be any conventional computer memory known in the art. The storage device 412 is able to include a hard drive, CDROM, CDRW, DVD, DVDRW, flash memory card or any other storage device. The computing device 400 is able to include one or more network interfaces 402. An example of a network interface includes a network card connected to an Ethernet or other type of LAN. The I/O device(s) 408 are able to include one or more of the following: keyboard, mouse, monitor, display, printer, modem, touchscreen, button interface and other devices. The operating software/applications 430 or function(s)/module(s) thereof are likely to be stored in the storage device 412 and memory 404 and processed as applications are typically processed. More or fewer components shown in FIG. 4 are able to be included in the computing device 400. In some embodiments, machine automation system hardware 420 is included. Although the computing device 400 in FIG. 4 includes applications 430 and hardware 420 for the system 100, the system 100 is able to be implemented on a computing device in hardware, firmware, software or any combination thereof.

Figure 5:
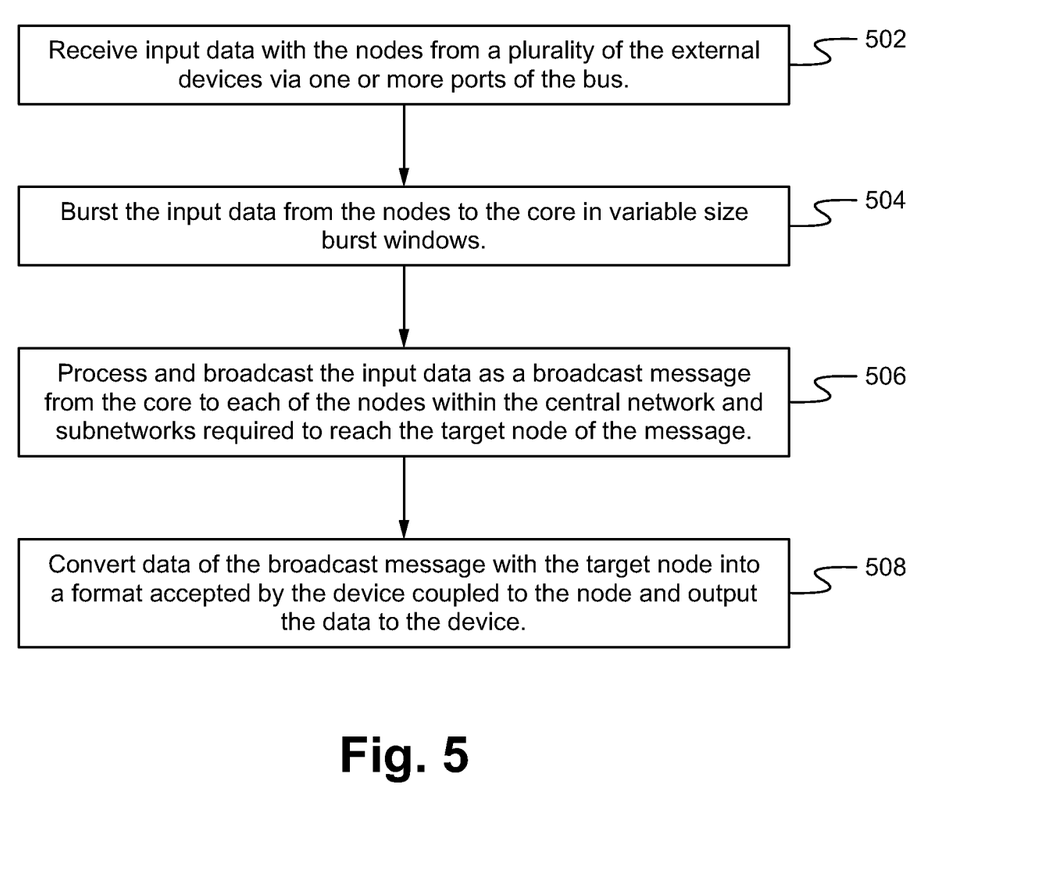
FIG. 5 illustrates a method of operating a machine automation system including an intelligent controller and sensor intranet bus according to some embodiments.

FIG. 5 illustrates a method of operating a machine automation system 100 including an intelligent controller and sensor intranet bus 104 according to some embodiments. As shown in FIG. 5, the nodes 204, 208 receive input data from a plurality of the external devices 102 via one or more ports 99 of the bus 104 at the step 502. The nodes 204, 208 burst the input data as burst messages to the core 200 in variable size burst windows at the step 504. In some embodiments, for each of the nodes 204, 208, the HDBA of the root ports 230 dynamically adjusts the burst window start time and size of the variable burst window and assign the adjusted window the corresponding node 204, 208 in a broadcast grant window message based on data traffic parameters reported from that one of the nodes 204, 208. In some embodiments, the gates 202 aggregate two or more burst messages including input data and/or traffic reporting received from the nodes 208 into single larger burst reporting or input data message for bursting to the core 200. In such embodiments, the gates 202 are able to omit portions of the received burst messages (e.g. preambles) in order to enhance the efficiency of the bus 104. In some embodiments, upon receiving the broadcast window grant messages from the core 200, the gates 202 adjust the original time of the burst window to an earlier time and broadcast the adjusted broadcast window grant messages to the nodes 208. As a result, the nodes 208 burst their data to the gates 202 before the window granted by the root port 230 such that the gates 202 are able to combine multiple burst messages together and burst them in the later original time window. The core 200 processes and broadcasts the input data as broadcast messages to each of the nodes 204, 208 within the central network 206 and subnetworks 210 required to reach the target node 204, 208 of the message at the step 506. The target node 204, 208 converts data of the broadcast message into a format accepted by the device 102 coupled to the node 204, 208 and outputs the data to the device 102 at the step 508. As a result, the method provides the advantage of enabling the bus 104 to maintain high speed despite the use of lower speed network mediums.

The system 100 and machine automation controller and sensor bus 104 implementing a dynamic burst to broadcast transmission network has numerous advantages. Specifically, it provides the benefit of a simple cable system and connection; the elimination of significant EMI impacts due to the user of optical fiber cable; guaranteed low latency for node-to-node communication; high throughput bandwidth from node to node transmission (10, 25, 100 or greater Gbps); can extend and reach up to 20 km from node to node devices; low power consumption due to passive-optical-network architecture; industry grade QoS without traffic congestion due to centralized DBA scheduling mechanism; built-in HARQ mechanism to guarantee node-to-node and GEM transmission successful; and one unified software image for full intranet system including all gate, node and root ports enabling simplified software architecture, shorter product development cycle, and easier system level debug, monitoring and trouble shooting remotely.

The present invention has been described in terms of specific embodiments incorporating details to facilitate the understanding of principles of construction and operation of the invention. Such reference herein to specific embodiments and details thereof is not intended to limit the scope of the claims appended hereto. It will be readily apparent to one skilled in the art that other various modifications may be made in the embodiment chosen for illustration without departing from the spirit and scope of the invention as defined by the claims. For example, although as described herein the bus is described as operating within a machine automation system, it is understood that the bus is able to operate with other types of systems and devices thereof for facilitating the communication between the devices.

What is claimed is:

1. A machine automation system for controlling and operating an automated machine, the system comprising:
  a controller and sensor bus including plurality of input/output ports and implementing a dynamic burst to broadcast transmission scheme; and
  a plurality of external machine automation devices operably coupled together via the ports of the bus, wherein the bus comprises a central processing core and a multi-medium transmission intranet comprising:
    one or more central transmission networks directly coupled to the core and formed by a first type of transmission medium, the central transmission networks including a plurality of nodes and one or more gates; and
    a plurality of subnetworks each coupled to a different one of the gates of one of the central transmission networks and formed by second types transmission mediums different than the first type of transmission medium, the subnetworks including a plurality of subnodes, wherein each of the nodes and the subnodes is coupled with one or more of the devices via one or more of the ports and receive input data from the one or more of the devices coupled to the one or more of the ports;
  wherein the bus relays the input data as messages from the nodes and the subnodes to the core and from the core to one or more of the nodes and the subnodes associated with the devices targeted by the messages by:
    bursting all of the messages from the nodes and the subnodes to the core in variable size burst windows; and
    broadcasting each of the messages from the core to:
      one node of group consisting of the nodes and the subnodes, the one node being associated with the device targeted by the message through one or more of the central transmission networks and the subnetworks; and
      all of the nodes and the subnodes within the central transmission network and one or more of the subnetworks through which the message must travel to reach the one node.

2. The system of claim 1, wherein the core dynamically adjusts and assigns a burst window start time and size to each of the nodes and the subnodes based on data traffic parameters reported from that one of the nodes and the subnodes.

3. The system of claim 2, wherein each of the gates aggregates the messages from a plurality of the subnodes into a single larger message.

4. The system of claim 3, wherein each of the gates omit portions of the messages from the plurality of the subnodes from the single larger message.

5. The system of claim 4, wherein each of the gates receives the burst window start times and sizes granted to each of the subnodes of the subnetwork coupled to the gate, adjusts the burst window start times to an earlier time and transmits the burst window start times and sizes as adjusted to each of the subnodes of the subnetwork coupled to the gate.

6. The system of claim 5, wherein the second types of transmission mediums have a higher latency than the first type of transmission medium.

7. The system of claim 6, wherein the first type of transmission medium is passive optical fiber and the central transmission networks are optical fiber networks.

8. The system of claim 7, wherein the second types of transmission mediums comprise one or more of the group consisting of active copper cable and wireless signals, and the plurality of subnetworks comprise one or more of the group consisting of an active copper cable network, a controller area network and a wireless network.

9. The system of claim 8, wherein the devices comprise one or more of the group consisting of an ultrasonic sensor, a light detection and ranging sensor, an infrared sensor, a camera, a motor and a microcontroller.

10. The system of claim 9, wherein the automated machine is one of the groups consisting of a robot and a self-driving vehicle.

11. A controller and sensor bus implementing a dynamic burst to broadcast transmission scheme and including plurality of input/output ports for coupling with a plurality of external machine automation devices of a machine automation system, the bus comprising:
  a central processing core; and
  a multi-medium transmission intranet comprising:
    one or more central transmission networks directly coupled to the core and formed by a first type of transmission medium, the central transmission networks including a plurality of nodes and one or more gates; and
    a plurality of subnetworks each coupled to a different one of the gates of one of the central transmission networks and formed by second types transmission mediums different than the first type of transmission medium, the subnetworks including a plurality of subnodes, wherein each of the nodes and the subnodes is coupled with one or more of the devices via one or more of the ports and receive input data from the one or more of the devices coupled to the one or more of the ports;
  wherein the bus relays the input data as messages from the nodes and the subnodes to the core and from the core to one or more of the nodes and the subnodes associated with the devices targeted by the messages by:
    bursting all of the messages from the nodes and the subnodes to the core in variable size burst windows; and
    broadcasting each of the messages from the core to:
      one node of group consisting of the nodes and the subnodes, the one node being associated with the device targeted by the message through one or more of the central transmission networks and the subnetworks; and
      all of the nodes and the subnodes within the central transmission network and one or more of the subnetworks through which the message must travel to reach the one node.

12. The bus of claim 11, wherein the core dynamically adjusts and assigns a burst window start time and size to each of the nodes and the subnodes based on data traffic parameters reported from that one of the nodes and the subnodes.

13. The bus of claim 12, wherein each of the gates aggregates the messages from a plurality of the subnodes into a single larger message.

14. The bus of claim 13, wherein each of the gates omit portions of the messages from the plurality of the subnodes from the single larger message.

15. The bus of claim 14, wherein each of the gates receives the burst window start times and sizes granted to each of the subnodes of the subnetwork coupled to the gate, adjusts the burst window start times to an earlier time and transmits the burst window start times and sizes as adjusted to each of the subnodes of the subnetwork coupled to the gate.

16. The bus of claim 15, wherein the second types of transmission mediums have a higher latency than the first type of transmission medium.

17. The bus of claim 16, wherein the first type of transmission medium is passive optical fiber and the central transmission networks are optical fiber networks.

18. The bus of claim 17, wherein the second types of transmission mediums comprise one or more of the group consisting of active copper cable and wireless signals, and the plurality of subnetworks comprise one or more of the group consisting of an active copper cable network, a controller area network and a wireless network.

19. The bus of claim 18, wherein the devices comprise one or more of the group consisting of an ultrasonic sensor, a light detection and ranging sensor, an infrared sensor, a camera, a motor and a microcontroller.

20. The bus of claim 19, wherein the automated machine is one of the groups consisting of a robot and a self-driving vehicle.

21. A method of operating a controller and sensor bus implementing a dynamic burst to broadcast transmission scheme for controlling and operating an automated machine, the bus having a central processing core and a multi-medium transmission intranet including one or more central transmission networks directly coupled to the core and formed by a first type of transmission medium, the central transmission networks including a plurality of nodes and one or more gates and a plurality of subnetworks each coupled to a different one of the gates of one of the central transmission networks and formed by second types transmission mediums different than the first type of transmission medium, the subnetworks including a plurality of subnodes, the method comprising:
receiving data from a plurality of external machine automation devices with each of the nodes and the subnodes that is coupled with one or more of the devices via one or more ports of the bus; and
relaying the input data with the bus as messages from the nodes and the subnodes to the core and from the core to one or more of the nodes and the subnodes associated with the devices targeted by the messages, wherein the relaying comprises:
bursting all of the messages from the nodes and the subnodes to the core in variable size burst windows; and
broadcasting each of the messages from the core to:
one node of group consisting of the nodes and the subnodes, the one node being associated with the device targeted by the message through one or more of the central transmission networks and the subnetworks; and
all of the nodes and the subnodes within the central transmission network and one or more of the subnetworks through which the message must travel to reach the one node.

22. The method of claim 21, further comprising dynamically adjusting and assigning a burst window start time and size to each of the nodes and the subnodes with the core based on data traffic parameters reported from that one of the nodes and the subnodes.

23. The method of claim 22, further comprising aggregating the messages from a plurality of the subnodes into a single larger message with each of the gates.

24. The method of claim 23, further comprising omitting portions of the messages from the plurality of the subnodes from the single larger message with each of the gates.

25. The method of claim 24, further comprising, with each of the gates, receiving the burst window start times and sizes granted to each of the subnodes of the subnetwork coupled to the gate, adjusting the burst window start times to an earlier time and transmitting the burst window start times and sizes as adjusted to each of the subnodes of the subnetwork coupled to the gate.

26. The method of claim 25, wherein the second types of transmission mediums have a higher latency than the first type of transmission medium.

27. The method of claim 26, wherein the first type of transmission medium is passive optical fiber and the central transmission networks are optical fiber networks.

28. The method of claim 27, wherein the second types of transmission mediums comprise one or more of the group consisting of active copper cable and wireless signals, and the plurality of subnetworks comprise one or more of the group consisting of an active copper cable network, a controller area network and a wireless network.

29. The method of claim 28, wherein the devices comprise one or more of the group consisting of an ultrasonic sensor, a light detection and ranging sensor, an infrared sensor, a camera, a motor and a microcontroller.

30. The method of claim 29, wherein the automated machine is one of the groups consisting of a robot and a self-driving vehicle.

* * * * *